US012636666B2

(12) United States Patent
Hansen et al.

(10) Patent No.: US 12,636,666 B2
(45) Date of Patent: May 26, 2026

(54) SPORTS FIELD WITH AUTOMATIC LINE MARKING

(71) Applicant: TinyMobileRobots ApS, Malling (DK)

(72) Inventors: Rudi Hansen, Galten (DK); Christoffer Mose, Marslet (DK); Peter Jensen, Skanderborg (DK); Palle Flydtkjær, Herning (DK); Kristian Korsgaard, Aarhus C (DK); Lasse Thorfinn Jagd, Skanderborg (DK); Jens Peder Kvols Kristensen, Malling (DK)

(73) Assignee: TinyMobileRobots ApS, Malling (DK)

( * ) Notice: Subject to any disclaimer, the term of this patent is extended or adjusted under 35 U.S.C. 154(b) by 341 days.

(21) Appl. No.: 18/284,712

(22) PCT Filed: Mar. 24, 2022

(86) PCT No.: PCT/EP2022/057769
§ 371 (c)(1),
(2) Date: Sep. 28, 2023

(87) PCT Pub. No.: WO2022/207451
PCT Pub. Date: Oct. 6, 2022

(65) Prior Publication Data
US 2024/0181482 A1 Jun. 6, 2024

(30) Foreign Application Priority Data
Mar. 29, 2021 (DK) ............................ PA 2021 00319

(51) Int. Cl.
*A63C 19/06* (2006.01)
*B05B 12/12* (2006.01)
(Continued)

(52) U.S. Cl.
CPC ............ *B05B 12/124* (2013.01); *A63C 19/06* (2013.01); *B05B 13/005* (2013.01); *G05D 1/229* (2024.01);
(Continued)

(58) Field of Classification Search
CPC ..... B05B 12/124; B05B 13/005; A63C 19/06; A63C 2019/067; A63C 19/065;
(Continued)

(56) References Cited

U.S. PATENT DOCUMENTS

| | | | | |
|---|---|---|---|---|
| 5,540,516 A | * | 7/1996 | Nicodemo | ............. A63C 19/06 404/93 |
| 8,021,077 B2 | * | 9/2011 | Annese | ................. E01C 23/222 404/93 |

(Continued)

FOREIGN PATENT DOCUMENTS

WO 2017/109066 A1 6/2017

OTHER PUBLICATIONS

International Search Report from International Application No. PCT/EP2022/057769, dated Jul. 12, 2022.

*Primary Examiner* — Nini F Legesse
(74) *Attorney, Agent, or Firm* — Morse, Barnes-Brown & Pendleton, P.C.; Sean D. Detweiler, Esq.

(57) ABSTRACT

A sports field having automatic line marking capabilities. The sports field includes a robotic total station in communication with a mobile marking robot configured for marking and re-marking of lines on a sports field.

11 Claims, 5 Drawing Sheets

(51) Int. Cl.

| | |
|---|---|
| *B05B 13/00* | (2006.01) |
| *G05D 1/229* | (2024.01) |
| *G05D 1/242* | (2024.01) |
| *G05D 1/248* | (2024.01) |
| *G05D 105/00* | (2024.01) |
| *G05D 109/10* | (2024.01) |
| *G05D 111/10* | (2024.01) |

(52) U.S. Cl.
CPC ............. *G05D 1/242* (2024.01); *G05D 1/248* (2024.01); *A63C 2019/067* (2013.01); *G05D 2105/17* (2024.01); *G05D 2109/10* (2024.01); *G05D 2111/17* (2024.01)

(58) Field of Classification Search
CPC ........ G05D 1/229; G05D 1/242; G05D 1/248; G05D 2105/17; G05D 2109/10; G05D 2111/17; G05D 1/0016; G05D 1/0221; G05D 1/0274; G05D 1/0278; G05D 1/0236; G05D 1/028; G01C 15/002; G01S 17/48; G01S 19/01; E01C 23/16

USPC ............................................ 473/415; 404/12
See application file for complete search history.

(56) References Cited

U.S. PATENT DOCUMENTS

| | | | |
|---|---|---|---|
| 2004/0057795 A1 | 3/2004 | Mayfield et al. | |
| 2007/0059098 A1* | 3/2007 | Mayfield ................ | A63C 19/06 404/84.5 |
| 2010/0143089 A1* | 6/2010 | Hvass ................... | G05D 1/027 414/754 |
| 2013/0310971 A1 | 11/2013 | Prouty | |
| 2019/0038960 A1 | 2/2019 | Roberts et al. | |
| 2019/0255551 A1* | 8/2019 | Hargadon .............. | B25J 9/1664 |
| 2019/0308323 A1* | 10/2019 | Kristensen ........... | E01C 23/163 |
| 2019/0337004 A1* | 11/2019 | Clifford .............. | B05B 13/0452 |
| 2019/0339710 A1 | 11/2019 | Sørensen et al. | |
| 2020/0157751 A1 | 5/2020 | Hutter et al. | |
| 2020/0338580 A1* | 10/2020 | Herget ................ | G05D 1/0212 |
| 2021/0016310 A1 | 1/2021 | Davis et al. | |

* cited by examiner

SPORTS FIELD WITH AUTOMATIC LINE MARKING

RELATED APPLICATIONS

This application is a national stage filing under 37 U.S.C. 371 of International Application No. PCT/EP2022/057769, filed Mar. 24, 2022, which claims priority to Denmark Patent Application No. PA 2021 00319, filed Mar. 29, 2021. The entire teachings of said applications are incorporated herein by reference. International Application No. PCT/EP2022/057769 was published under PCT Article 21(2) in English.

TECHNICAL FIELD OF THE INVENTION

The present invention relates to sports fields.

BACKGROUND OF THE INVENTION

Line marking on sports fields, such as marking the playing field at a stadium, is very demanding. Ground managers responsible for stadiums are aware of the need for special attention to the lines defining the playing field, including commercials marked thereon, as thousands of spectators are viewing the game taking place from the seats around the field, and millions may be following the game from TV, or other medias. The human eye is extremely good at detecting slightly imperfect straight lines, even a small deviation from straightness of a few centimeters is annoying. The requirements to accuracy, straightness, and perfectness are therefore extreme. No straight lines may curve, and no corners by be imperfect.

It is an objective of the present invention to provide a sports field that solves or at least minimizes the above-mentioned problems.

DESCRIPTION OF THE INVENTION

The present invention introduces an intelligent sports field with automatic line marking comprising a robotic total station in wireless communication with a mobile marking robot.

A first aspect relates to the use of a robotic total station and a mobile marking robot for repetitive re-markings of a playing field on a sports field, said robotic total station being positioned at a fixed position and orientation relative to said sports field.

A second aspect relates to a sports field with automatic line marking; said sports field comprising:

a first area with the dimensions and structure corresponding to receiving a marking of a playing field;

a second area adjacent to said first area;

a mobile robot comprising:

a) a chassis with a drive including at least a driven wheel;

b) a spray means comprising a spray nozzle;

c) a positioning system configured for continuously receiving a positioning signal;

d) a control unit operably connected to said drive, said positioning system, and said spray nozzle;

e) a reflective device, such as a prism; and f) a database configured for storing way point data corresponding to a playing field to be marked; and a robotic total station positioned at a fixed position and orientation within said second area and comprising:

i) an electronic theodolite unit configured for determining the position of said mobile robot;

ii) an electronic distance sensor unit;

iii) a wireless communication unit communicatively coupled to the positioning system of said mobile robot and operably connected to said theodolite unit and distance sensor;

iv) a means adapted for tracking the position of said reflective device, such as a laser tracker unit, and adapted for continuously directing said theodolite unit and distance sensor unit towards said reflective device;

wherein said theodolite unit and distance sensor unit are configured to send, via said wireless communication unit, determined position data of said mobile robot to the positioning system of said mobile robot; and wherein said positioning system is configured for continuously or periodically determining the position of said spray nozzle based on said received positioning signal and to send this information to the control unit of said mobile robot;

wherein said control unit, in response to instructions about a given playing field to be marked on a surface within said first area, and in response to continuously or periodically received spray nozzle position data, is configured to:

move or position said mobile robot by activating or deactivating said drive; and optionally, move or position said spray nozzle by activating or deactivating a drive mechanism of said spray nozzle; and activate or deactivate said spray means, thereby automatically marking said playing field on a surface within said first area.

In the present context, the term "sports field" is to be understood as a field or area for holding sports arrangements, such as a stadium. The sports field may include one or more marked playing fields, such as a football field or a soccer field, adjacent areas for players and coaches, and areas for spectators. Hence, the playing field has dimensions and structure corresponding to the rules of the game, which you can play on it. The term "game" should mean any competition carried out according to the rules, which may include football, soccer, handball, basketball, volleyball, field hockey, tennis, and the like.

The term "chassis" is used herein to refer to at least a part of the main framework of the mobile robot.

The term "spray nozzle" is defined to be a nozzle, an orifice, a spray valve, a pressure reducing tubing section, and any combination thereof.

As used herein, the term "total station" means a land survey instrument that combines the angle-measuring capabilities of a transit with electronic distance measurement. A "robotic total station" is a total station that allows remote operation. In a typical surveying application, a total station, positioned at a known location, directs a beam of laser light to a target positioned by a surveyor at a point to be surveyed. The target includes retroreflectors, which reflect the beam back to the total station. By measuring the time of flight of the beam, the distance between the total station and the target is determined. By also measuring the direction of the beam from the total station to the target, i.e., the altitude and azimuth angles that define a vector from the total station to the target, the location of the target is precisely determined. Preferably, the robotic total station is capable of locating and tracking a target without being attended by an operator. In one or more embodiments, the robotic total station is configured to automatically locate and track the mobile marking robot. With a robotic total station, the surveyor moves the target (here, preferably a mobile marking robot) around the work site. Servo motors in the robotic total station cause it to rotate toward the target, providing precise angular and distance measurements as the surveyor moves to various locations at the work site. The total station automatically tracks the remote target as it moves, thus providing real-time position data for the target. The present invention utilizes this technology to provide the mobile marking robot with real-time position data, thereby securing that the marking is performed with millimeter accuracy. This solution combines the high accuracy positioning with user friendliness, thereby allowing even inexperienced grounds managers to setup and operate the sports field. The mobile robot is therefore equipped with a reflective device, such as a retroreflector, e.g., a prism. The mobile robot may comprise a retroreflector. Any retroreflector generally known within the art of land surveying, may be used. In one or more embodiments, the retroreflector is a 360-degree all-around retroreflector. In one or more embodiments, the positioning system is positioned on an elongate member extending upward from the chassis. In one or more embodiments, the elongate member is height adjustable. e.g., comprising telescoping elongate members.

Thereby, the robotic total station can track the mobile marking robot. To be able to receive the real-time position data from the robotic total station, the mobile robot comprises a positioning system configured for continuously receiving such data in a positioning signal.

A basic problem with a positioning system using a total station compared to a system utilizing Global Navigation Satellite System (GNSS), is that a total station only provides measurements based on its own position. While a GNSS offers a global coordinate system, the total station only offers a local coordinate system with 0,0 as its own relative position, and 0-degree rotation from where it is randomly placed. Hence, in the process of re-marking a playing field, a user will need to perform a site calibration to ensure that the total station is positioned and the orientated in the same way each time. As a site calibration requires the use of three or more reflectors mounted on or at the sports field, this is a tedious process.

Hence, the present invention provides a robotic total station positioned at a fixed position and orientation adjacent to the area to be marked with a playing field. This configuration secures that the relative coordinate system remains the same each time the playing field needs to be re-marked.

In one or more embodiments, the sports field further comprises:
- a handheld computer configured for being in communication, preferably wireless, with said mobile robot and configured for use in computing waypoints corresponding to a playing field template to be marked on said first area, said way points being based on the relative coordinate system of said robotic total station. The handheld computer is primarily used for setting up the system for the first time but could obviously also be used to activate and communicate with both the robotic total station and the mobile marking robot.

In order to adjust the playing field to the first area, the handheld computer preferably comprises:
- a processor;
- a memory coupled to said processor, wherein said memory comprises program instructions configured for accepting manual positioning of said mobile robot at two or more target locations on said first area, as well as accepting manual selection of a playing field template for being marked on said first area; wherein said program instructions are executable by the processor for:

storing two or more target locations as waypoints;
- computing the best fit for said selected playing field template on said first area based on said stored waypoints;
- computing waypoint coordinates of said playing field template for being marked from said fitted position of said playing field template; and
- storing said computed waypoint coordinates of said playing field template; and
- transmitting said computed waypoint coordinates to said mobile robot.

The computed and stored waypoints of said playing field template for being marked preferably includes predefined reference points defining specific positions on said playing field template. Such reference points could as non-limiting examples be a center point, a corner point, a goal post position, a group of points defining a midline, or the like.

When the mobile robot receives the waypoints defining the playing field, the spraying means is configured for marking said playing field template on said first area based on said waypoint coordinates.

To aid the user in collecting target locations at the first area, the handheld computer may be configured to show a map of the first area with the user position present, when the user is holding/carrying it. Therefore, the handheld computer may preferably comprise:
- a database comprising data corresponding to a georeferenced map;
- a display means configured to display said georeferenced map;
- a positioning system configured for receiving a GNSS signal;
- wherein said display means is configured to provide display signals for displaying stored waypoints and the current GNSS position of said mobile robot relative thereto; and wherein said display means is configured, on said displayed georeferenced map, to display said stored waypoints and said current GNSS position of said mobile robot relative thereto in response to said display signals.

Global Navigation Satellite Systems (GNSS) is a collective term for a variety of satellite navigation systems, which use orbiting satellites as navigation reference points to determine position fixes on the ground. GNSS includes the Global Positioning System (GPS), the Global Navigation Satellite System (GLONASS), the Compass system, Galileo, and several Satellite based augmentation systems (SBAS). In typical civilian applications, a single GNSS receiver can measure a ground position with a precision of about ten meters. This is, in part, due to various error contributions, which often reduce the precision of determining a position fix. For example, as the GNSS signals pass through the ionosphere and troposphere, propagation delays may occur. Other factors, which may reduce the precision of determining a position fix, may include satellite clock errors, GNSS receiver clock errors, and satellite position errors. One method for improving the precision for determining a position fix is Real-Time Kinematic (RTK) GNSS. Real Time Kinematic (RTK) satellite navigation is a technique using the phase of the signal's carrier wave, rather than the information content of the signal, and relies on a single reference station or interpolated virtual station to provide real-time corrections.

In one or more embodiments, the handheld computer is configured to provide signals to said mobile robot to delete one or more of said displayed stored waypoints.

The shown map is preferably georeferenced. To align the collected points to the relative coordinate system of the robotic total station, the handheld computer preferably comprises:

a) a database comprising data corresponding to a georeferenced map;

b) a display means configured to display said georeferenced map;

c) a wireless communication unit communicatively coupled to said mobile robot;

d) a positioning system configured for receiving a GNSS signal; and e) a control unit;

wherein said control unit comprises:

a processor;

a memory coupled to said processor, wherein said memory comprises program instructions for accepting positioning of the handheld computer at two or more target locations within the first and/or second area, wherein a first target location corresponds to the position of said robotic total station, and wherein a second target location is the position of said mobile robot; wherein the program instructions are executable by the processor to:

process said two target locations as GNSS positions of said robotic total station and said mobile robot, respectively, to send a display signal for displaying said two target locations to said display means as a first layer; and process a georeferenced map stored in said database and to send a display signal for displaying said stored georeferenced map to said display means as a second layer;

wherein said display means is configured to overlay said first and second layers such that the GNSS positions of said robotic total station and said mobile robot are shown on their respective GNSS positions on said georeferenced map.

In one or more embodiments, the sports field further comprises a mounting plate mounted to a fixed position within said second area, and wherein said robotic total station is adapted for releasably fastening to said mounting plate. This configuration allows the user to reuse the robotic total station for marking or re-marking multiple playing fields within the first area, and still be certain to reposition the robotic total station in the right position. In order to secure the right orientation of the robotic total station, the mounting plate preferably comprises a first female or male component, and wherein said robotic total station comprises, respectively, a second male or female component; wherein said female component is configured to removably receive a male component; wherein said female component is shaped and configured to allow only one discrete rotational orientation of said male component within said female component. Thereby, the robotic total station can only be oriented in one way when mounted to the mounting plate.

In one or more embodiments, the spray means comprises an airbrush-based spray tool.

In one or more embodiments, the spray means comprises an inkjet-based spray tool, preferably based on a drop-on-demand technology.

In one or more embodiments, the spray means comprises a tool comprising an array of spray nozzles, such as 2-100 spray nozzles, preferably arranged either in a direction along the length of said chassis, or in a direction along the width of said chassis.

In one or more embodiments, the chassis comprises two differentially driven wheel in a fixed orientation and arranged on the same first axis line in parallel; and one off-centered orientable wheel arranged along a second axis line perpendicular to the first axis line, and in front or behind the first axis line.

The term "off-centered wheel" (castor wheel) is defined to be a wheel, where the vertical axis does not pass through the center of the wheel but is slightly off-centered. Some designs include a swivel joint (orientable) between the wheel and the fork so that it can rotate freely with 360° of freedom. The advantage with an off-centered orientable wheel compared to a centered orientable wheel is that the centered orientable wheel tends to lock in specific positions.

In one or more embodiments, the mobile robot further comprises a paint reservoir. The paint reservoir may be configured as a bag-in-box type reservoir, or simply as a replaceable bag reservoir, or a replaceable box reservoir.

In one or more embodiments, the differentially driven wheels are positioned near the rear end of the chassis, and wherein the off-centered orientable wheel is positioned near the front end of the chassis. Preferably, the off-centered orientable wheel is positioned equally distanced from each of the drive wheels.

In one or more embodiments, the spray means further comprises a return line through which paint can recirculate from a position upstream to the spray nozzle outlet and back to the paint reservoir. This configuration removes air from the paint and tubing, such that the spray nozzle will not splutter when painting a line.

In one or more embodiments, the spray means comprises means adapted for adjusting the drive mechanism and/or spray nozzle position in the vertical direction relative to the ground surface on which the mobile robot moving.

In one or more embodiments, the spray means comprises a mechanism, such as a telescopic arm or the like, adapted for lowering and raising said spray nozzle(s) relative to the surface on which the mobile robot is moving. In one or more embodiments, the mobile robot further comprises a sensor configured for continuously determining the distance between said spray nozzle(s) and said surface, and wherein said control unit is configured to receive data about said distance from said sensor and in response thereto, change said distance by activating said mechanism to move said spray nozzle(s) relative to said surface. Distance sensors are well-known within the art and will thus not receive further attention.

In one or more embodiments, the control unit, in response to line width information about said geometric figure to be marked, is configured to continuously or periodically alter said line width by activating said mechanism to lower or raise said spray nozzle(s) relative to said surface. As the distance is increase between the spray nozzle and the surface, the paint, or the like, will spread more relative to a distance closer to the surface.

It should be noted that embodiments and features described in the context of one of the aspects of the present invention also apply to the other aspects of the invention.

DETAILED DESCRIPTION OF THE INVENTION

Figure 1:
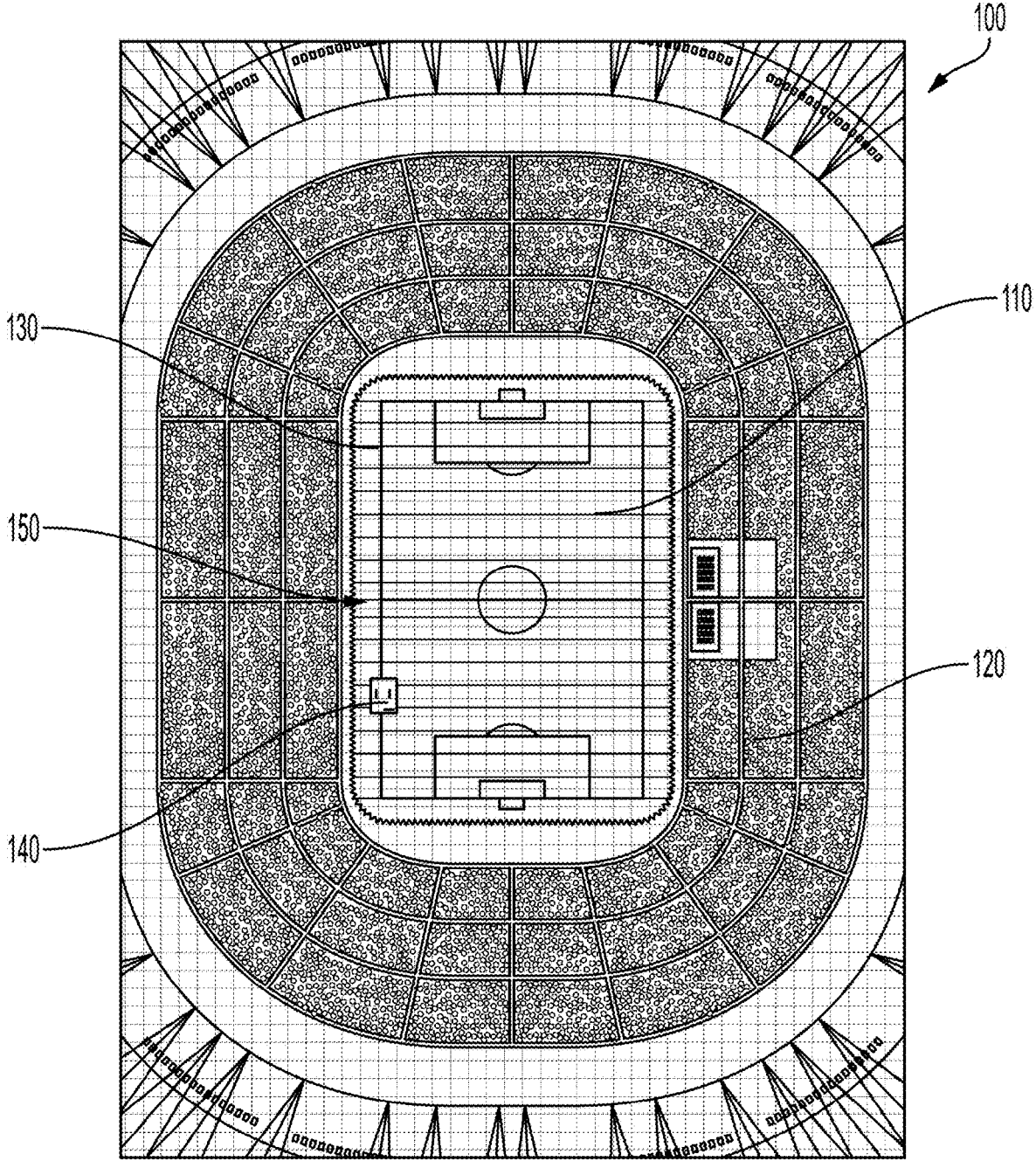
FIG. 1 shows a sports field in accordance with various embodiments of the invention.

A preferred embodiment of the invention is shown in FIG. 1. The sports field 100 comprises a first area 110 with the dimensions and structure corresponding to receiving a marking of a playing field 130, a second area 120 adjacent to said first area 110, a mobile marking robot 140, and a robotic total station 150. The robotic total station 150 is positioned at a fixed position (here shown located next to the middle of the sideline) and orientation relative to said sports field 100.

The mobile robot may be adapted to move along a series of waypoints, either in a given order, or randomly. The waypoints each comprises two- or three-dimensional position information and, optionally, two- or three-dimensional orientation information. The mobile robot may be wheeled or tracked.

When the sports field 100 is built for the first time, when the playing field type is changed, or when the playing field is moved, the ground manager or user will need to learn the mobile marking robot 140 how to mark the playing field 130 on the ground of the first area 110. Therefore, the ground manager or user needs to collect target locations within the first area to instruct the mobile robot where to mark. To secure a very precise collection of target locations, it is performed with the mobile robot aided by the robotic total station, preferably via a handheld computer as control. The ground manager or user may be aided in the process by showing a georeferenced map of the sports field on the handheld computer, and where the handheld computer is located relative thereto. The georeferenced map is typically an orthorectified aerial imagery downloaded from a map service, e.g., Bing maps (bingmapsportal.com), in tiles of small square images. The map service provider matches the images to the real world in a specified CRS, e.g., EPSG: 2056. Using OpenLayers, the georeferenced map is projected onto the view of the handheld computer.

Figure 2:
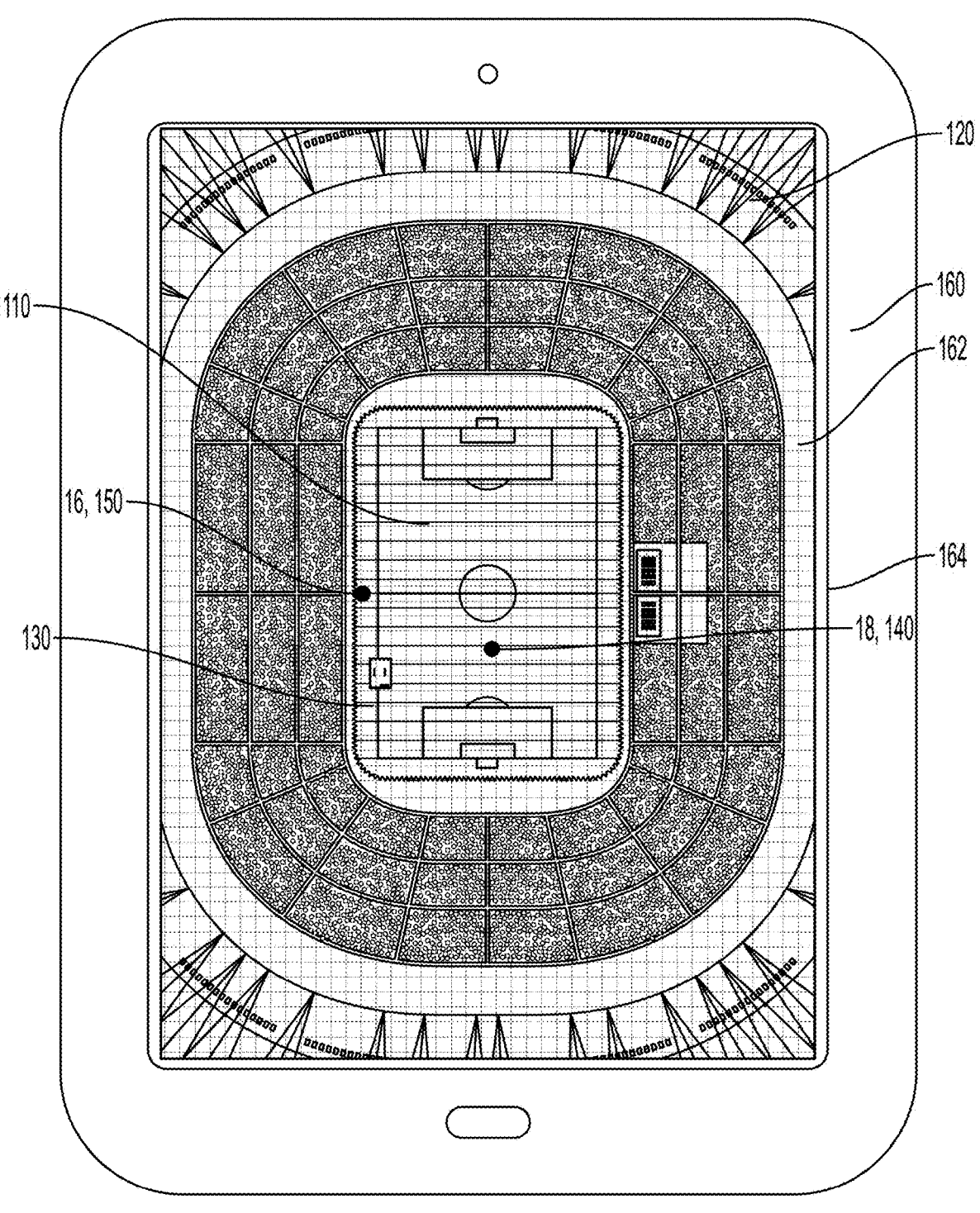
FIGS. 2-3 depict snapshots of a user view on a handheld computer during the operation of a methodology in accordance with various embodiments of the invention.

FIG. 2 shows a snapshot of a user view on a handheld computer 160, where a georeferenced map 162 (The shown soccer field is only present for better understanding of the process), and two target locations 16, 18 are shown in the display means 164. The first target location 16 corresponds to the robotic total station 150 positioned within the second area 120. The second target location 18 corresponds to the mobile robot 140 positioned within the first area 110. The two target locations 16, 18 have been processed as GNSS positions, and the graphical layer corresponding to the georeferenced map has been geographically correctly positioned relatively thereto.

Figure 3:
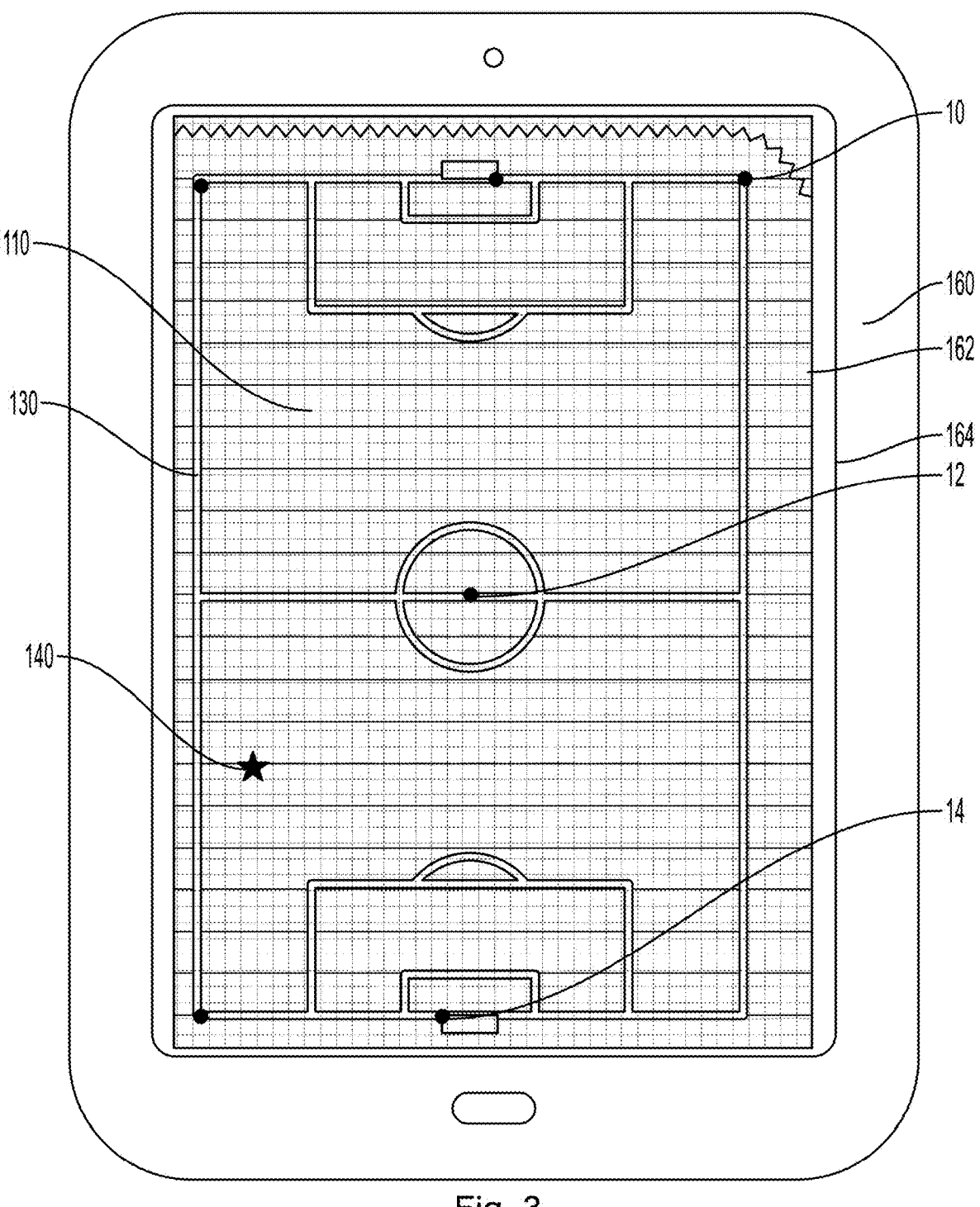

Now the user can start the process of collecting target locations for use for the mobile robot 140 to process to prepare the playing field template for marking on the ground of the first area 110. In FIG. 3, the user has zoomed in on the georeferenced map 162 of FIG. 2 to only view the first area 110. Six target locations 10, 12, 14 (only three locations are numbered) have been collected and displayed in the display means 164 together with the geographical position of the mobile robot (visualized as a star to differentiate it from the target locations) 140.

Three collected target locations 10 are corners, two collected target locations 14 are goal posts, and the final target location 12 is the center of the playing field 130. Based on the collected target locations, the handheld computer 160 is configured for computing the best fit for the selected playing field template (here a soccer field) on the first area 110. The handheld computer 160 computes waypoint coordinates (may be performed with or without approval from the user) of said playing field template for being marked from said fitted position of said playing field template, stores said computed waypoint coordinates, and transmits said computed waypoint coordinates to the mobile robot 140.

Figure 5:
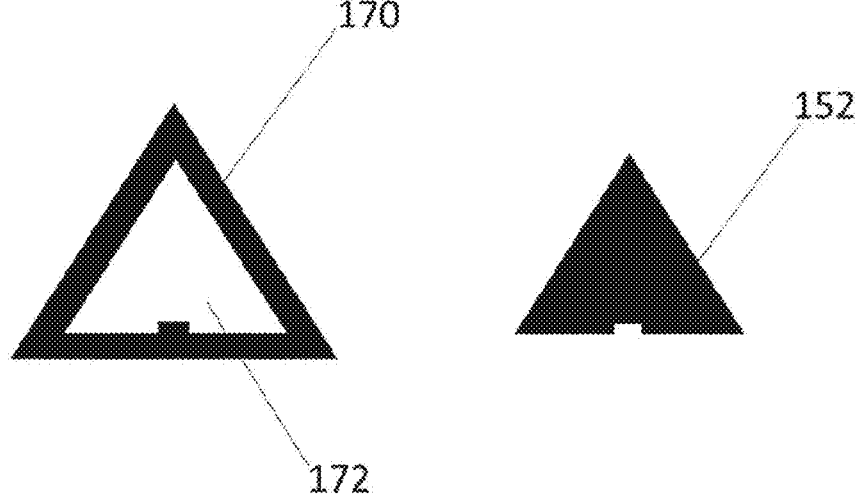
FIG. 5 depicts a mounting plate in accordance with various embodiments of the invention.

Now the mobile marking robot 140 can re-mark the playing field at any time without the need for further input as long as it is connected to the robotic total station 150. The sports field 100 may obviously comprise a timer unit configured for activating the mobile marking robot 140 and the robotic total station 150. The robotic total station 150 may be releasably fastened to a mounting plate 170 mounted to a fixed position within said second area 120. In FIG. 5, the mounting plate 170 (to the left) is shown comprising a first female 172 component. The robotic total station 150 comprises a second male component 152 (shown to the right). The first female component 172 is configured to removably receive the second male component 152 and is shaped and configured to allow only one discrete rotational orientation of said male component 152 within said female component 172.

Figure 4:
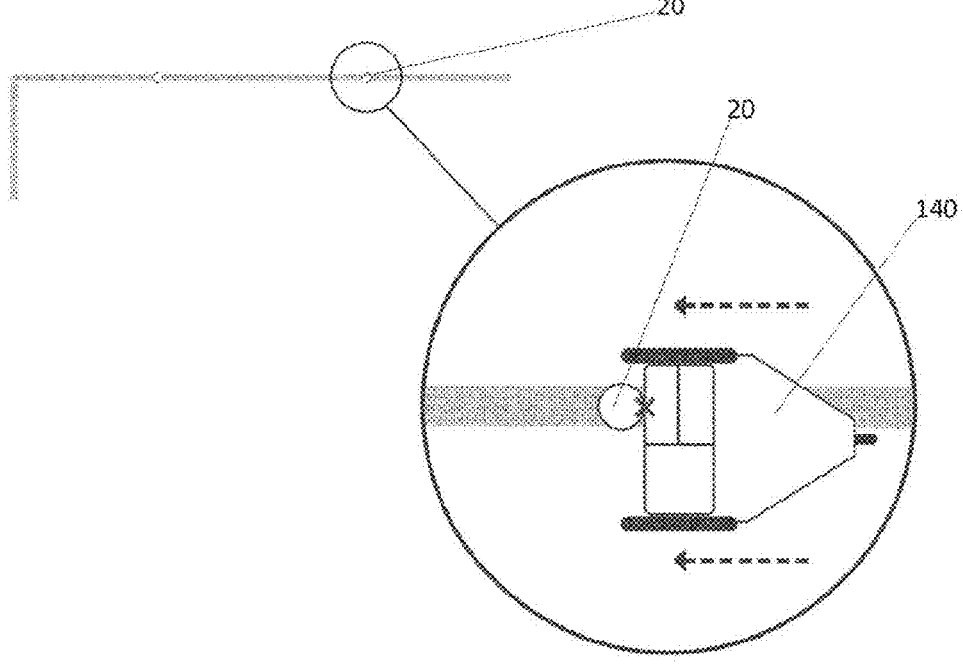
FIG. 4 depicts the process of collecting reference points with the mobile robot.

FIG. 4 depicts the process of collecting reference points with the mobile robot 140. Normally, the target locations are collected by placing a known component, such as the prism, of the mobile robot on/above the target location that is to be collected. The mobile robot can be placed by driving it manually, via the control unit/input device, to the location or by moving it by hand or both. Here, a goal post 20 is collected as a target location by positioning the mobile robot 140 just beside it. The mobile robot 140 may comprise a position determining device (not shown) to aid in obtaining the correct geographical position of the goal post 20.

As an example, and in order for the mobile robot to operate, it's control unit may comprise a computing system including a processor, a memory, a communication unit, an output device, an input device, and a data store, which may be communicatively coupled by a communication bus. The mentioned computing system should be understood as an example and that it may take other forms and include additional or fewer components without departing from the scope of the present disclosure. For instance, various components of the computing device may be coupled for communication using a variety of communication protocols and/or technologies including, for instance, communication buses, software communication mechanisms, computer networks, etc. The computing system may include various operating systems, sensors, additional processors, and other physical configurations. The processor, memory, communication unit, etc., are representative of one or more of these components. The processor may execute software instructions by performing various input, logical, and/or mathematical operations. The processor may have various computing architectures to method data signals (e.g., CISC, RISC, etc.). The processor may be physical and/or virtual and may include a single core or plurality of processing units and/or cores. The processor may be coupled to the memory via the bus to access data and instructions therefrom and store data therein. The bus may couple the processor to the other components of the computing system including, for example, the memory, the communication unit, the input device, the output device, and the data store. The memory may store and provide data access to the other components of the computing system. The memory may be included in a single computing device or a plurality of computing devices. The memory may store instructions and/or data that may be executed by the processor. For example, the memory may store instructions and data, including, for example, an operating system, hardware drivers, other software applications, databases, etc., which may implement the techniques described herein. The memory may be coupled to the bus for communication with the processor and the other components of computing system. The memory may include a non-transitory computer-usable (e.g., readable, writeable, etc.) medium, which can be any non-transitory apparatus or device that can contain, store, communicate, propagate, or transport instructions, data, computer programs, software, code, routines, etc., for processing by or in connection with the processor. In some implementations, the memory may include one or more of volatile memory and non-volatile memory (e.g., RAM, ROM, hard disk, optical disk, etc.). It should be understood that the memory may be a single device or may include multiple types of devices and configurations. The input device may include any device for inputting information into the computing system. In some implementations, the input device may include one or more peripheral devices. For example, the input device may include the display unit comprising a touchscreen integrated with the output device, etc. The output device may be any device capable of outputting information from the computing system. The output device may be the display unit, which display electronic images and data output by a processor of the computing system for presentation to a user, such as the processor or another dedicated processor. The data store may include information sources for storing and providing access to data. In some implementations, the data store may store data associated with a database management system (DBMS) operable on the computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. The data stored by the data store may be organized and queried using various criteria including any type of data stored by them. The data store may include data tables, databases, or other organized collections of data. The data store may be included in the computing system or in another computing system and/or storage system distinct from but coupled to or accessible by the computing system. The data stores can include one or more non-transitory computer-readable mediums for storing the data. In some implementations, the data stores may be incorporated with the memory or may be distinct therefrom. The components may be communicatively coupled by the bus and/or the processor to one another and/or the other components of the computing system. In some implementations, the components may include computer logic (e.g., software logic, hardware logic, etc.) executable by the processor to provide their acts and/or functionality. These components may be adapted for cooperation and communication with the processor and the other components of the computing system.

REFERENCES

10 Target location
12 Target location
14 Target location
16 Target location
18 Target location 20 Goal post
100 Sports field
110 First area
120 Second area
130 Playing field
140 Mobile robot
150 Robotic total station
152 Male component
160 Handheld computer
170 Mounting plate
172 Female component

The invention claimed is:

1. A sports field with automatic line marking; said sports field comprising:
   a first area with the dimensions and structure corresponding to receiving a marking of a playing field; and
   a second area adjacent to said first area;
   characterized in that said sports field further comprises:
   a mobile robot comprising:
      a) a chassis with a drive including at least a driven wheel;
      b) a spray means comprising a spray nozzle;
      c) a positioning system configured for continuously receiving a positioning signal;
      d) a control unit operably connected to said drive, said positioning system, and said spray nozzle;
      e) a reflective device, such as a prism; and
      f) a database configured for storing way point data corresponding to a playing field to be marked;
   a robotic total station positioned within said second area and at a fixed position and orientation relative to said first area and comprising:
      i) an electronic theodolite unit configured for determining the position of said mobile robot;
      ii) an electronic distance sensor unit;
      iii) a wireless communication unit communicatively coupled to the positioning system of said mobile robot and operably connected to said theodolite unit and distance sensor;
      iv) a means adapted for tracking the position of said reflective device, such as a laser tracker unit, and adapted for continuously directing said theodolite unit and distance sensor unit towards said reflective device;
   wherein said theodolite unit and distance sensor unit are configured to send, via said wireless communication unit, determined position data of said mobile robot to the positioning system of said mobile robot;
   wherein said positioning system is configured for continuously or periodically determining the position of said spray nozzle based on said received positioning signal and to send this information to the control unit of said mobile robot;
   wherein said control unit, in response to instructions about a given playing field to be marked or re-marked on a surface within said first area, and in response to continuously or periodically received spray nozzle position data, is configured to:
   move or position said mobile robot by activating or deactivating said drive; and
   optionally, move or position said spray nozzle by activating or deactivating a drive mechanism of said spray nozzle; and
   activate or deactivate said spray means, thereby automatically marking said playing field on a surface within said first area.

2. The sports field according to claim 1, further comprising:

a handheld computer configured for being in communication, preferably wireless, with said mobile robot and configured for use in computing waypoints corresponding to a playing field template to be marked on said first area, said way points being based on the coordinate system of said robotic total station.

3. The sports field according to claim 2, wherein said handheld computer comprises:

a processor;

a memory coupled to said processor, wherein said memory comprises program instructions configured for accepting an instruction that the user of said mobile robot is to start the process of collecting target locations by manual positioning of said mobile robot at two or more target locations on said first area, as well as accepting manual selection of a playing field template for being marked on said first area; wherein said program instructions are executable by the processor for:

storing the two or more target locations, on which the said mobile robot has been placed, as waypoints;

computing the best fit for said selected playing field template on said first area based on said stored waypoints;

computing waypoint coordinates of said playing field template for being marked from said fitted position of said playing field template; and storing said computed waypoint coordinates of said playing field template; and transmitting said computed waypoint coordinates to said mobile robot.

4. The sports field according to claim 3, wherein said computed and stored waypoints of said playing field template for being marked includes predefined reference points defining specific positions on said playing field template.

5. The sports field according to claim 4, wherein said predefined reference points are selected from the group consisting of a center point, a corner point, a goal post position, and a group of points defining a midline.

6. The sports field according to claim 5, wherein said spray nozzle is configured for marking said playing field template on said first area based on said waypoint coordinates.

7. The sports field according to claim 2, wherein said handheld computer comprises:

a database comprising data corresponding to a georeferenced map;

a display means configured to display said georeferenced map;

a positioning system configured for receiving a GNSS signal;

wherein said display means is configured to provide display signals for displaying stored waypoints and the current GNSS position of said mobile robot relative thereto; and wherein said display means is configured, on said displayed georeferenced map, to display said stored waypoints and said current GNSS position of said mobile robot relative thereto in response to said display signals.

8. The sports field according to claim 7, wherein said handheld computer is configured to provide signals to said mobile robot to delete one or more of said displayed stored waypoints.

9. The sports field according to claim 2, wherein said handheld computer comprises:

a) a database comprising data corresponding to a georeferenced map;

b) a display means configured to display said georeferenced map;

c) a wireless communication unit communicatively coupled to said mobile robot;

d) a positioning system configured for receiving a GNSS signal; and e) a control unit;

wherein said control unit comprises:

a processor;

a memory coupled to said processor, wherein said memory comprises program instructions for accepting positioning of the handheld computer at two or more target locations within the first and/or second area, wherein a first target location corresponds to the position of said robotic total station, and wherein a second target location is the position of said mobile robot; wherein the program instructions are executable by the processor to:

process said two target locations as GNSS positions of said robotic total station and said mobile robot, respectively, to send a display signal for displaying said two target locations to said display means as a first layer; and process a georeferenced map stored in said database and to send a display signal for displaying said stored georeferenced map to said display means as a second layer;

wherein said display means is configured to overlay said first and second layers such that the GNSS positions of said robotic total station and said mobile robot are shown on their respective GNSS positions on said georeferenced map.

10. The sports field according to claim 9, further comprising a mounting plate mounted to a fixed position within said second area, wherein said robotic total station is adapted for releasably fastening to said mounting plate, wherein said mounting plate comprises a first female or male component, and wherein said robotic total station comprises, respectively, a second male or female component; wherein said female component is configured to removably receive a male component;

wherein said female component is shaped and configured to allow only one discrete rotational orientation of said male component within said female component.

11. The sports field according to claim 2, further comprising a mounting plate mounted to a fixed position within said second area, wherein said robotic total station is adapted for releasably fastening to said mounting plate, wherein said mounting plate comprises a first female or male component, and wherein said robotic total station comprises, respectively, a second male or female component; wherein said female component is configured to removably receive a male component;

wherein said female component is shaped and configured to allow only one discrete rotational orientation of said male component within said female component.

* * * * *